(12) United States Patent
Troia et al.

(10) Patent No.: US 11,914,373 B2
(45) Date of Patent: Feb. 27, 2024

(54) ARTIFICIAL NEURAL NETWORK INTEGRITY VERIFICATION

(71) Applicant: Micron Technology, Inc., Boise, ID (US)

(72) Inventors: Alberto Troia, Munich (DE); Antonino Mondello, Messina (IT); Michelangelo Pisasale, Catania (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/953,266

(22) Filed: Sep. 26, 2022

(65) Prior Publication Data

US 2023/0021289 A1 Jan. 19, 2023

Related U.S. Application Data

(63) Continuation of application No. 16/229,044, filed on Dec. 21, 2018, now Pat. No. 11,454,968.
(Continued)

(51) Int. Cl.
*G06N 3/063* (2023.01)
*G06F 17/16* (2006.01)
(Continued)

(52) U.S. Cl.
CPC ....... *G05D 1/0088* (2013.01); *G06F 11/1012* (2013.01); *G06F 17/16* (2013.01);
(Continued)

(58) Field of Classification Search
CPC ........ G05D 1/00; G05D 1/0088; G06F 11/00; G06F 11/07; G06F 11/08; G06F 11/10;
(Continued)

(56) References Cited

U.S. PATENT DOCUMENTS

| 7,577,623 B2 | 8/2009 | Genty et al. |
| 2006/0242424 A1 | 10/2006 | Kitchens et al. |

(Continued)

OTHER PUBLICATIONS

International Search Report and Written Opinion from related International Patent Application No. PCT/JS2019/015067, dated May 13, 2019, 10 pages.

*Primary Examiner* — Charles J Han
(74) *Attorney, Agent, or Firm* — Brooks, Cameron & Huebsch, PLLC (57) ABSTRACT

An example method comprises receiving a number of inputs to a system employing an artificial neural network (ANN), wherein the ANN comprises a number of ANN partitions each having respective weight matrix data and bias data corresponding thereto stored in a memory. The method includes: determining an ANN partition to which the number of inputs correspond, reading, from the memory the weight matrix data and bias data corresponding to the determined ANN partition, and a first cryptographic code corresponding to the determined ANN partition; generating, using the weight matrix data and bias data read from the memory, a second cryptographic code corresponding to the determined ANN partition; determining whether the first cryptographic code and the second cryptographic code match; and responsive to determining a mismatch between the first cryptographic code and the second cryptographic code, issuing an indication of the mismatch to a controller of the system.

18 Claims, 6 Drawing Sheets

Related U.S. Application Data (60) Provisional application No. 62/636,214, filed on Feb. 28, 2018.

(51) Int. Cl.
    *G05D 1/00*     (2006.01)
    *H04L 9/32*     (2006.01)
    *G06F 11/10*     (2006.01)
    *G06F 21/00*     (2013.01)

(52) U.S. Cl.
    CPC ............. *G06F 21/00* (2013.01); *G06N 3/063* (2013.01); *H04L 9/3239* (2013.01); *H04L 9/3242* (2013.01)

(58) Field of Classification Search
CPC .. G06F 11/1008; G06F 11/1012; G06F 17/00; G06F 17/10; G06F 17/16; G06F 21/00; G06F 21/50; G06F 21/57; G06N 3/00; G06N 3/02; G06N 3/06; G06N 3/063; H04L 2209/00; H04L 2209/84; H04L 9/00; H04L 9/32; H04L 9/3236; H04L 9/3239

See application file for complete search history.

(56) References Cited

U.S. PATENT DOCUMENTS

| | | |
|---|---|---|
| 2014/0215621 A1 | 7/2014 | Xaypanya et al. |
| 2016/0285866 A1 | 9/2016 | Allen et al. |
| 2016/0350648 A1 | 12/2016 | Gilad-Bachrach et al. |
| 2017/0193361 A1 | 7/2017 | Chilimbi et al. |
| 2017/0206449 A1* | 7/2017 | Lain ................ G06N 3/02 |
| 2017/0372201 A1* | 12/2017 | Gupta ............... G06N 20/00 |

* cited by examiner

ARTIFICIAL NEURAL NETWORK INTEGRITY VERIFICATION

PRIORITY INFORMATION

The application is a Continuation of U.S. application Ser. No. 16/229,044, filed on Dec. 21, 2018, which claims benefit of U.S. Provisional Application No. 62/636,214, filed Feb. 28, 2018, the contents of which are incorporated herein by reference.

TECHNICAL FIELD

The present disclosure relates generally to semiconductor memory and methods, and more particularly, to apparatuses and methods related to artificial neural network integrity verification.

BACKGROUND

Artificial intelligence (AI) is being employed in a broad range of industries and in various electronic systems. For instance, artificial neural networks (ANNs) are being employed in autonomous driving systems. As the use of AI in such electronic systems evolves, various questions and/or concerns arise. For instance, overall system safety of electronic systems employing AI is a major concern.

In the autonomous vehicle context, preventing errors and/or handling errors that may be generated by, for example, evaluating (e.g., elaborating) sensor inputs, is likely necessary in order for the technology to gain acceptance. Security is also a major concern in autonomous driving contexts since a security hack could result in major safety issues. Therefore, it can be beneficial to provide methods and/or systems capable of providing improved error handling and/or improved safety associated electronic systems employing AI while limiting the impact to system performance.

DETAILED DESCRIPTION

The present disclosure includes apparatuses and methods related to artificial neural network integrity verification. Various embodiments provide technological advantages such as improved data integrity within electronic systems that utilize an artificial neural network. For instance, embodiments can improve safety within such systems by detecting whether synaptic weight and bias information being elaborated by the system has changed (e.g., due to a security breach, due to "bit flips" within a memory used to store the information, due to errors occurring during transfer of the information between system components, etc.).

In various instances, embodiments can prevent such data integrity issues from causing and/or becoming a safety concern. For example, responsive to determining that the weight and bias information being elaborated has changed since being stored, embodiments can issue a safety warning to a control component responsible for performing actions based on the elaborated output from performing such action. As one specific example, consider elaboration of sensor inputs by an electronic control unit (ECU) of an autonomous vehicle utilizing an ANN. The output of such elaboration may affect various vehicle subsystems responsible for braking, steering, accelerating, etc. In such circumstances, elaboration based on inaccurate and/or incorrect weight and bias information may result in unsafe braking, turning, acceleration, etc. However, an integrity verification operation in accordance with a number of embodiments of the present disclosure can confirm the integrity of weight and bias information prior to the ECU executing the various functions that may be affected by elaboration of the information. Accordingly, the various ECU functions may be prevented from being performed responsive to detection of a data integrity failure.

As described further herein, a number of embodiments utilize cryptography to perform data integrity checks within systems employing an ANN. Some previous approaches may utilize cryptography to encrypt (e.g., hide) data (e.g., sensitive and/or private) such that it is less susceptible to security hacks. However, such previous methods do not involve the use of cryptography in association with ANN integrity verification such as described herein.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure and should not be taken in a limiting sense.

Figure 1:
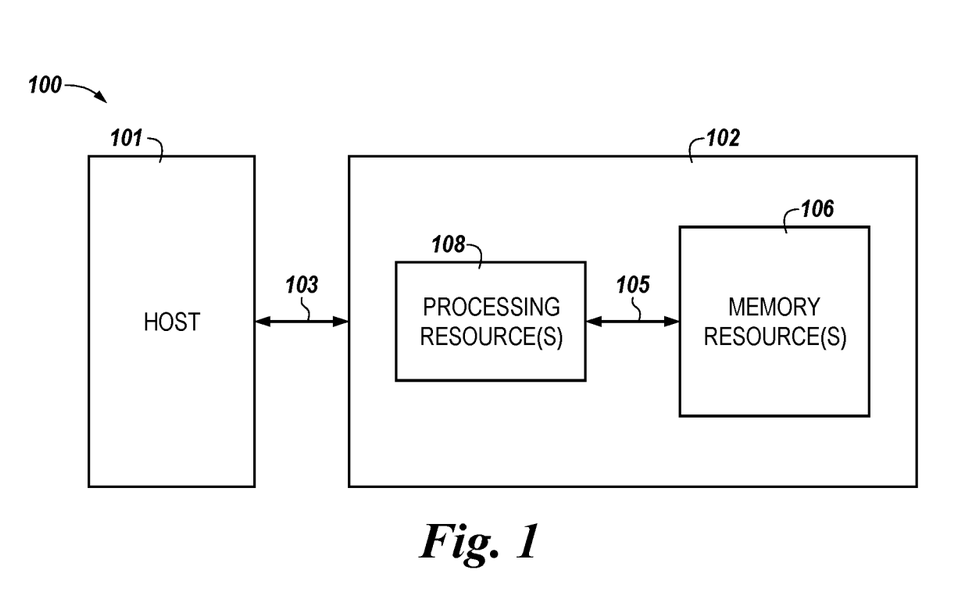
FIG. 1 is a block diagram of an apparatus in the form of an electronic system including a subsystem configured to perform ANN integrity verification in accordance with a number of embodiments of the present disclosure.

FIG. 1 is a block diagram of an apparatus in the form of an electronic system 100 including a subsystem 102 configured to perform ANN integrity verification in accordance with a number of embodiments of the present disclosure. As used herein, an "apparatus" can refer to, but is not limited to, a variety of structures or combinations of structures. For instance, subsystem 102, memory resource 106, processing resource 108, and host 101 might separately be considered an "apparatus".

The subsystem 102 can be, for example, a control unit such as an ECU of an autonomous vehicle. In other examples, the subsystem 102 may be a storage system such as a solid state drive (SSD). In this example, the system 100 includes a host 101 coupled to subsystem 102 via interface 103. As examples, host 101 can be a host system such as a personal laptop computer, a desktop computer, a digital camera, a mobile device (e.g., cellular phone), network server, Internet of Things (IoT) enabled device, or a memory card reader, among various other types of hosts. As another example, host 101 can be an external host device capable of wireless communication with subsystem 102 (e.g., via a gateway).

Figure 2:
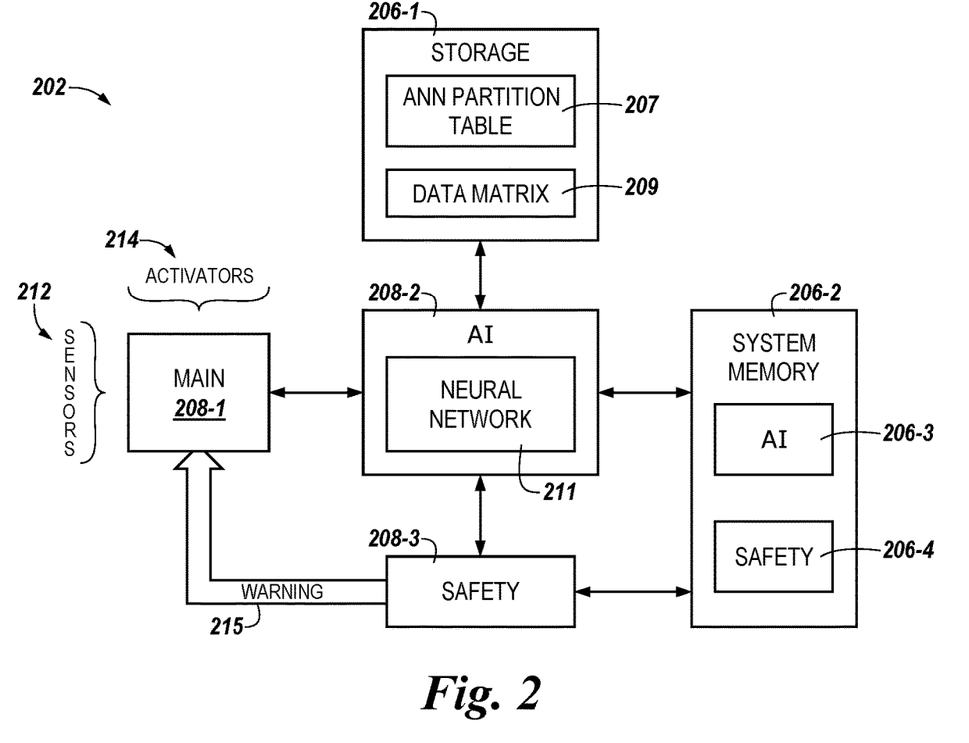
FIG. 2 is a block diagram of an apparatus in the form of a control unit configured to perform ANN integrity verification in accordance with a number of embodiments of the present disclosure.

The processing resource(s) 108 can be, for example, one or more discreet components (e.g., a number of controllers such as controllers 208-1, 208-2, and 208-3 shown in FIG. 2) that can be coupled to the memory resource(s) 106 via an interface 105 (e.g., a bus, which may include a combined address/control/data bus or one or more separate busses). The processing resource(s) 108 may include a central processing unit (CPU), semiconductor based microprocessor, integrated circuit based microprocessor, vector processor, and/or other hardware device(s) suitable for retrieval and execution of instructions stored in the memory resource 106. In a number of embodiments, the processing resource 108 may be implemented as one or more application specific integrated circuits (ASICs), field programmable gate arrays (FPGAs), digital signal processors (DSPs), etc.

The processing resource(s) 108 can control access to the memory 106 and/or can facilitate data transfer between the host 101 and the memory 106. As described further herein, the processing resource(s) 108 can be responsible for executing instructions to perform various operations associated with ANN integrity verification in accordance with embodiments of the present disclosure. For example, the processing resource 108 can receive ANN partition updates, authenticate the updates, update an ANN partition table based on the updates, compare cryptographic codes read from memory with newly generated verification cryptographic codes, provide safety warnings responsive to integrity verification failures, etc.

The memory resource(s) 106 can comprise a number of memory devices. The memory devices 106 can include memory devices comprising non-volatile or volatile memory. For instance, the memory devices may comprise non-volatile memory such as Flash memory or phase change memory serving as a storage volume (e.g., storage memory) for the system and/or the memory devices may comprise volatile memory such as DRAM, SRAM, etc. serving as system memory (e.g., main memory for the system).

As described further below, in a number of embodiments, the memory 106 can store an ANN partition table (e.g., partition table 307) comprising cryptographic codes corresponding to respective ANN partitions. The cryptographic codes may be digests or cryptographic signatures, for example. The memory 106 can also store various matrix data associated with an ANN employed by the system 101 (e.g., an ANN such as ANN 561 or 571 shown in FIGS. 5A and 5B, respectively), as well as various instructions executable by processing resource 108 in association with ANN integrity verification.

FIG. 2 is a block diagram of an apparatus in the form of a control unit 202 configured to perform ANN integrity verification in accordance with a number of embodiments of the present disclosure. The control unit 202 can be a subsystem such as subsystem 102 described in FIG. 1. In this example, control unit 202 can be an ECU of an autonomous vehicle.

The ECU 202 includes a number of processing resources 208-1, 208-2, and 208-3, which may be collectively referred to as controllers 208. Controller 208-1 represents a main controller that can be responsible for, among other things, obtaining data (e.g., from a number of vehicle sensors 212) to be elaborated via a ANN 211 and operating a number of actuators 214 responsive to outputs from the ANN 211. The sensors 212 can include various sensors such as image sensors, radar sensors, and LIDAR sensors, among others. The actuators 214 can include various actuators associated with braking, gear shifting, accelerating, steering, etc.

Figure 5A:
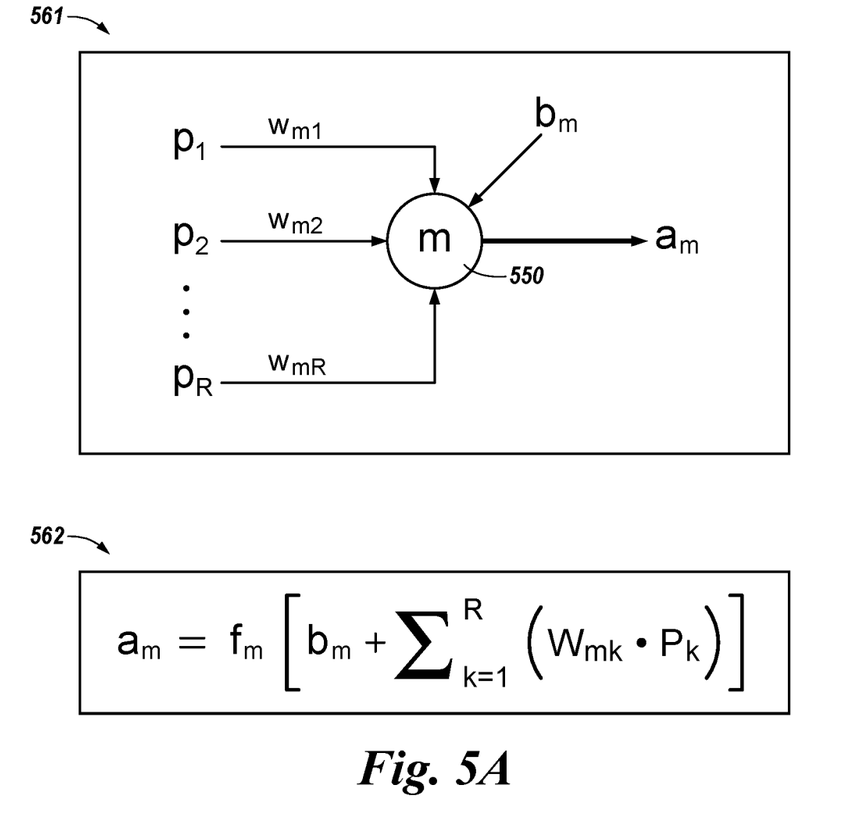
FIG. 5A illustrates an example of a generic node of an ANN on which ANN integrity verification can be performed in accordance with a number of embodiments of the present disclosure.

Controller 208-2 represents an AI controller that can be responsible performing elaboration of inputs to a neural network 211. The neural network 211 can be an ANN such as ANN 261 shown in FIG. 5A or 571 shown in FIG. 5B; however, embodiments are not limited to a particular type of ANN. The AI controller 208-2 can access ANN partition data (e.g., synaptic weight matrix and bias data), which can be stored in memory 206-1 and/or 206-2 and can provide ANN outputs based on application of an activation function (e.g., activation function 562) to the content (e.g., to the input data, weight data, and bias data). The AI controller 208-2 can also be responsible for executing algorithms associated with "training" the ANN 211.

Controller 208-3 represents a safety controller that can be responsible for generating cryptographic codes (which may be "digests" or "signatures" depending on whether a secret key is used in association with generating the cryptographic codes) corresponding to respective ANN partitions, and comparing the generated cryptographic codes (which may be referred to as "verification cryptographic codes") with those read from memory (e.g., 206-1). As described further below, the cryptographic code corresponding to a particular ANN partition can be based on a hash of the synaptic weights and biases corresponding to the particular ANN partition. In operation, the verification cryptographic codes generated by the controller 208-3 can be compared to corresponding verification codes of an ANN partition table 207, which can be read from memory 206-1 and provided to controller 208-3 (e.g., via memory 206-2).

The controller 208-3 can also be responsible for providing indications (e.g., 215) of integrity verification failures (e.g., to controller 208-1) responsive to determining that a cryptographic code from the ANN partition table does not match a corresponding verification code generated by controller 208-3. The indication 215 can represent a safety warning to the controller 208-1, which can then determine an appropriate action to take (or not) responsive to receiving the safety warning.

In this example, the control unit 202 includes a storage memory resource 206-1, which may be non-volatile memory and a system memory resource 206-2, which may be volatile memory serving as main memory for the controllers 208-2 and 208-3. In this example, the system memory 206-2 includes portions 206-3 (e.g., "AI") and 206-4 (e.g., "SAFETY), which are dedicated to the respective controllers 208-2 and 208-3; however, embodiments are not so limited. Also, although not shown in FIG. 2, the main controller 208-1 may be coupled to a separate dedicated system memory resource.

As shown in FIG. 2, the storage memory 206-1 is used to store the ANN partition table 207 as well as for data matrix 209 storage. The data matrix 209 can include the various ANN partition data such as the synaptic weights and biases corresponding to the nodes and layers of ANN partitions associated with ANN 211, which can be stored as various vectors, matrices, and/or combinations thereof. Particular examples of ANN integrity verification operations that can be performed via control unit 202 are described further below in association with FIGS. 4A and 4B, for instance.

Figure 3:
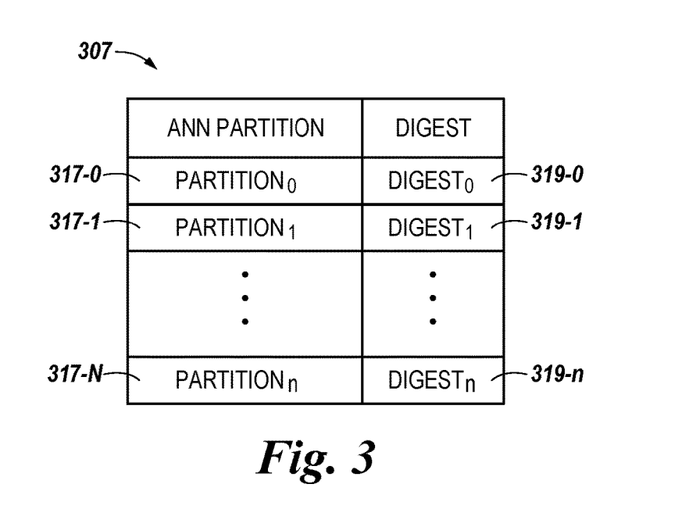
FIG. 3 is an example of an ANN partition table that can be used in association with performing ANN integrity verification in accordance with a number of embodiments of the present disclosure.

FIG. 3 is an example of an ANN partition table 307 that can be used in association with performing ANN integrity verification in accordance with a number of embodiments of the present disclosure. The ANN partition table 307 includes cryptographic codes 319-0 ($DIGEST_0$), 319-1 ($DIGEST_1$), ..., 319-n ($DIGEST_n$) for "n" respective ANN partitions 317-0 ($PARTITION_0$), 317-1 ($PARTITION_1$), ..., 317-n ($PARTITION_n$).

In a number of embodiments, each code 319 can be a digest generated using a cryptographic hash algorithm that can be represented by the equation:

$$DIGEST_n = HASH(S\|B)$$

where "$DIGEST_n$" is the cryptographic code corresponding to the partition (e.g., partition "n"), "S" is the set of all synaptic weights contained in the partition, "B" is the set of all biases contained in the partition, and "$\|$" represents concatenation. As noted above, in a number of embodiments, "HASH" can be an unkeyed hash algorithm such as SHA-1, SHA-224, SHA-256, MD5, MD6, etc. Alternatively, the cryptographic codes can be generated using a keyed hash algorithm (e.g., HMAC, VMAC, UMAC, etc.) by using a message authentication code (MAC) algorithm with a secret key (e.g., cryptographic code=HMAC [secret key, $S\|B$]). The specific ordering of the concatenated weights ($w_{ij}$) and biases ($b_k$) within the HASH (e.g., $w_{11}\|w_{12}\|w_3\|$ ..., $\|w_{mn} ... b_1\|b_2\|b_k$) can be fixed to avoid the hash of a same set of weights and biases yielding different results. One of ordinary skill in the art will appreciate that the respective values for the weights and biases can be fixed or floating point values each represented by 8 bits, 32 bits, 64 bits, etc., depending on the implementation.

Accordingly, a partition table such as ANN partition table 307 provides unique cryptographic codes corresponding to respective ANN partitions of an ANN network. As described further below, in operation, the partition table can be, for example, read from storage memory (e.g., 206-1) into system memory (e.g., 206-3) of a safety controller (e.g., 208-3) responsive to a triggering event. A triggering event might be use, by an AI controller (e.g., 208-2) of one of the partitions of the ANN. In such an example, the AI controller can read the corresponding data matrix (e.g., synaptic weight and bias data) from the storage memory in order to elaborate ANN inputs and provide an output to the main controller (e.g., 208-1). In order to verify the integrity of the weight and bias data, the safety controller can also be provided with the weight and bias data read from the storage memory. The safety controller can, while the AI controller is elaborating the inputs, newly generate (e.g., calculate) a cryptographic code (which may be referred to as a "verification cryptographic code") and compare it to the corresponding cryptographic code from the partition table 307. The verification cryptographic code is generated in the same manner as the original cryptographic code (e.g., the cryptographic codes stored in table 307). For instance, "HASH ($S\|B$)" is used to generate the verification cryptographic code, where "S" is the set of all synaptic weights contained in a partition (e.g., $partition_n$), and "B" is the set of all biases contained in the partition. The comparison resulting in a match can provide some assurance regarding the integrity of the weight and bias data being used by the AI controller. In contrast, the comparison resulting in a mismatch can indicate errors associated with the weight and bias data being used by the AI controller. Accordingly, a safety warning can be provided to the main controller responsive to a determined mismatch.

A mismatch between the stored cryptographic code (e.g., digest) and the verification cryptographic code (e.g., verification digest) can result due to various circumstances. For example, a security hack may result in altering of the data (e.g., data matrix 209) stored in memory. Another example is bit failures occurring within the stored data. In various instances, an error correction code (ECC) engine may be able to correct one or more erroneous bits in data read from memory. However, one common error correction technique is single error correction, dual error detection (e.g., of a page of data). In such scenarios, multiple errors may be detected, and it is not unusual for the ECC engine to introduce additional errors into the page, which could also result in a reduction in data integrity associated with data provided to the AI controller. A third example which could result in mismatch detection according to embodiments of the present disclosure is due to bus communication issues. For instance, issues such as cross-talk, inter symbol interference, etc. can result in status changes to one or more bus lines as data is moved between system components. Erroneous data resulting from the above sources and others can be detected by embodiments of the present disclosure, which can reduce the likelihood of undesirable and/or dangerous system effects.

Figure 4A:
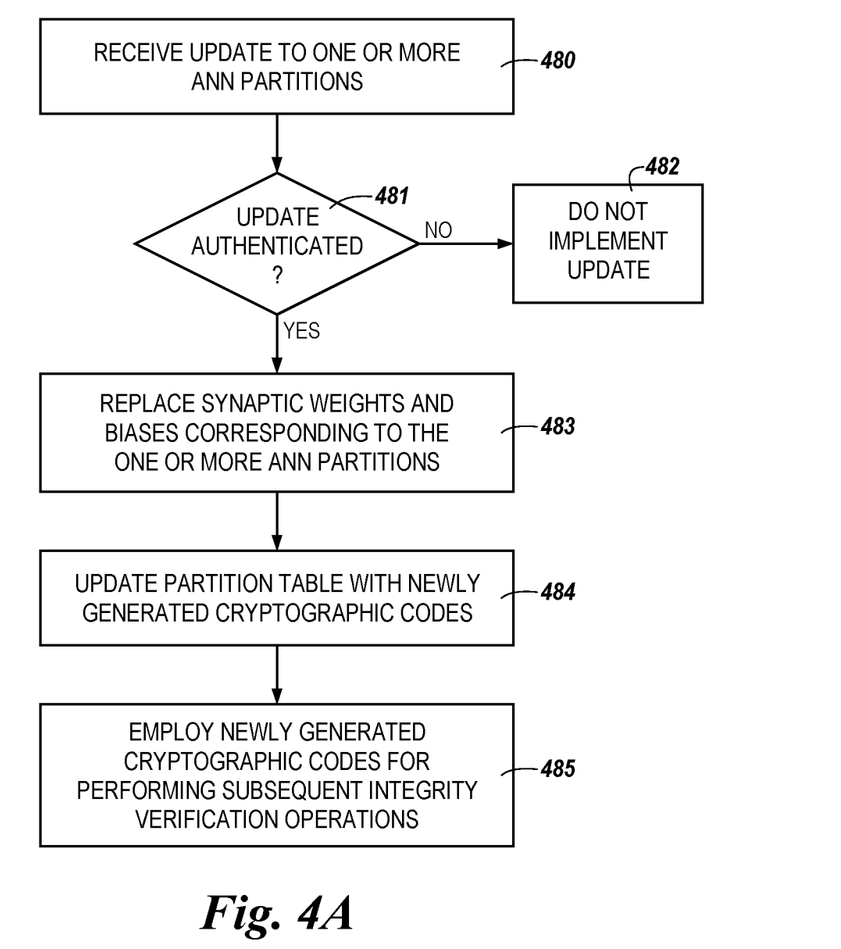
FIG. 4A is flow diagram associated with performing ANN integrity verification in accordance with a number of embodiments of the present disclosure.

FIG. 4A is flow diagram associated with performing ANN integrity verification in accordance with a number of embodiments of the present disclosure. At 480, the method includes receiving an update to one or more ANN partitions. The update can include various changes to the partition such as adjustments to synaptic weights, adjustments to biases, addition of nodes, deletion of nodes, etc. Initialization of the partition table (e.g., 207, 307) can occur prior to a system (e.g., ECU 202) being provided to a customer, which can ensure initial authenticity of the partition table. However, it can be beneficial to authenticate subsequent updates received by one or more external devices (e.g., host 101), which may or may not be secure. As such, at 481 it is determined whether the update is authenticated. The authentication can be done via various cryptographic methods, for example. If the update fails authentication, then the update is not implemented (e.g., as shown at 482).

Responsive to authentication of the update, the weights and biases corresponding to the one or more partitions involved in the update are updated (e.g., replaced with new values) as shown at 483. At 484, the partition table is updated with newly generated cryptographic codes. For instance, since the weights and/or biases of the partition have been updated, the digest for the partition will necessarily change. The new/replacement codes are determined according to a cryptographic hash function as described above.

As shown at 485, subsequent to updating the partition table with the newly generated cryptographic codes, those new codes are used for performing subsequent integrity verification operations, one example of which is described below in association with FIG. 4B.

Figure 4B:
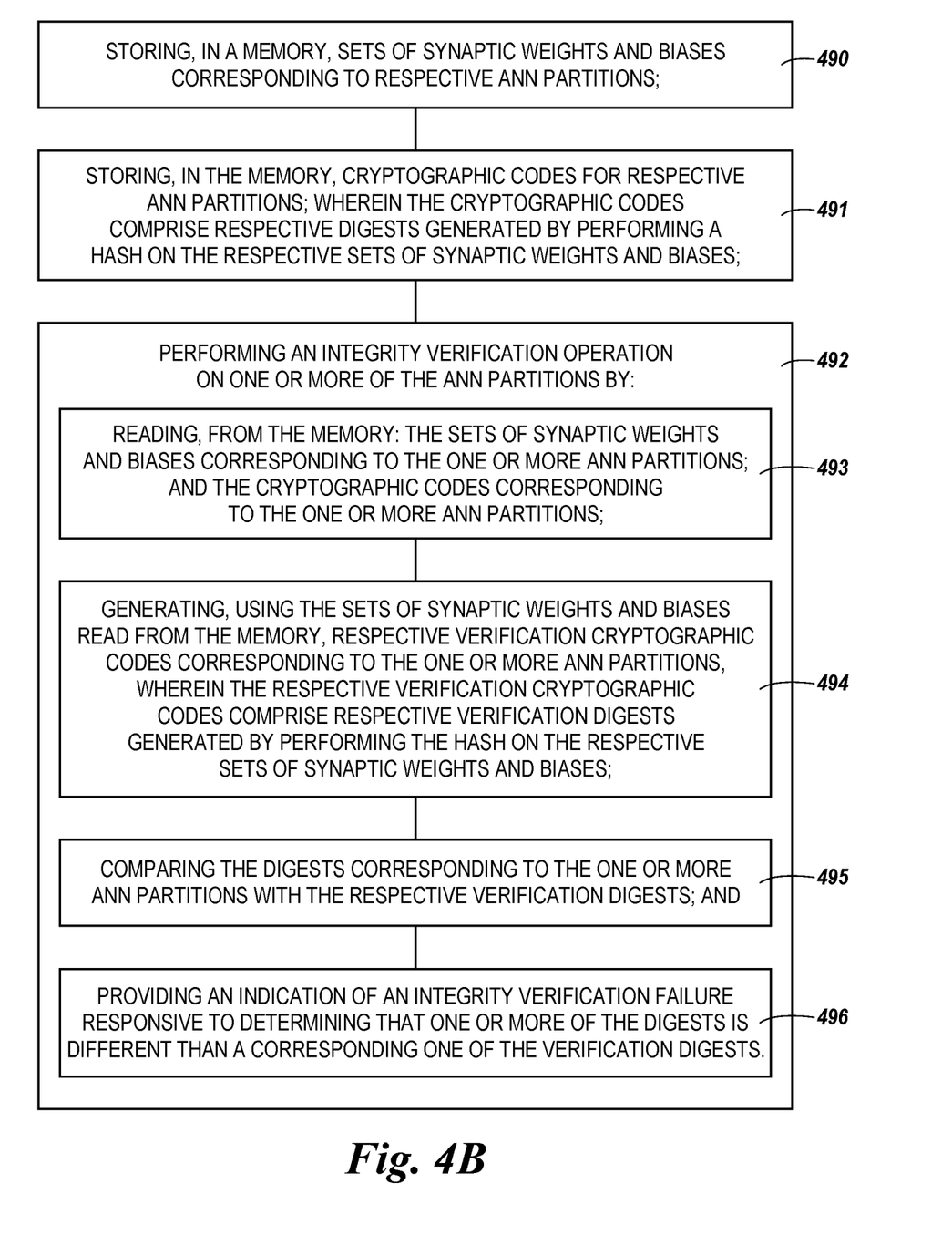
FIG. 4B is flow diagram associated with performing ANN integrity verification in accordance with a number of embodiments of the present disclosure.

FIG. 4B is flow diagram associated with performing ANN integrity verification in accordance with a number of embodiments of the present disclosure. At 490, the method includes storing, in a memory (e.g., 206-1) sets of synaptic weights and biases (e.g., matrix data 209) corresponding to respective ANN partitions. At 491, the method includes storing, in the memory, cryptographic codes for the respective ANN partitions. The cryptographic codes can be, for example, digests generated by performing a hash on the respective sets of synaptic weights and biases. The digests can be stored in a partition table such as partition table 207 shown in FIG. 2 and partition table 307 shown in FIG. 3.

At 492, the method includes performing an integrity verification operation on one or more of the ANN partitions. As shown at 493, performing the integrity verification operation can include reading, from the memory, the sets of synaptic weights and biases corresponding to the one or more ANN partitions, as well as the cryptographic codes corresponding to the one or more ANN partitions. For instance, an AI controller (e.g., 208-2) can read the partition table as well as the synaptic weight and bias information from memory (e.g., 206-1) and can provide both to a safety controller (e.g., 208-3).

At 494, the integrity verification operation includes generating, using the sets of synaptic weights and biases read from the memory, respective verification cryptographic codes corresponding to the one or more ANN partitions. As described above, the verification cryptographic codes comprise respective verification cryptographic codes generated by performing the hash on the concatenated respective sets of synaptic weights and biases.

At 495, the integrity verification operation includes comparing the cryptographic codes corresponding to the one or more ANN partitions with the respective verification cryptographic codes. At 496, the integrity verification operation includes providing an indication of an integrity verification failure responsive to determining that one or more of the cryptographic codes is different than a corresponding one of the verification cryptographic codes. The indication can be in the form of a safety warning sent from a safety controller to a main controller that is responsible for controlling system operations based on received outputs from the ANN (e.g., via an AI controller).

FIG. 5A illustrates an example of a generic node (e.g., "neuron") 550 of an ANN on which ANN integrity verification can be performed in accordance with a number of embodiments of the present disclosure. In this example, node 550 represents an "$m^{th}$" node of a feedforward ANN 561. The ANN 561 can be a neural network such as neural network 211 shown in FIG. 2. Although not shown in FIG. 5A, the ANN 561 can include multiple layers (e.g., an input layer comprising input nodes, an output layer comprising output nodes, and a number of intermediate "hidden" layers comprising respective sets of intermediate nodes). As described herein, a number of embodiments of the present disclosure can include performing ANN integrity verification of ANN partitions. As used herein, an ANN partition can comprise, for example, all of the nodes of a particular layer within an ANN, a subset of nodes from a particular layer, or a subset of nodes from two or more different layers of an ANN. Additionally, a particular node (e.g., node 550) might reside in multiple different ANN partitions. In general, an ANN partition refers to a subset of nodes of a particular ANN.

As shown in FIG. 5A, a particular node (e.g., 550) can receive a number of inputs (e.g., $p_1, p_2, \ldots, p_R$) each having a synaptic weight "$w_{mk}$" (e.g., $w_{m1}, w_{m2}, \ldots, w_{mR}$) associated therewith. In FIG. 5A, "$w_{mk}$" represents a portion of a weight matrix, with "m" corresponding to an "$m^{th}$" row of the weight matrix and "R" being an index corresponding to respective inputs. As shown in FIG. 5A, node 550 also includes an associated bias (e.g., $b_m$).

As shown in FIG. 5A, the output (e.g., $a_m$) of node (e.g., 550) can be determined based on an activation function (e.g., $f_m$) and the set of inputs (e.g., $b_m$, $w_{mk}$, and $p_k$). An example output is given by equation 562. The activation function "$f_m$" can be various functions such as a step function, a sign function, a sigmoid function, or a linear function, among others.

Figure 5B:
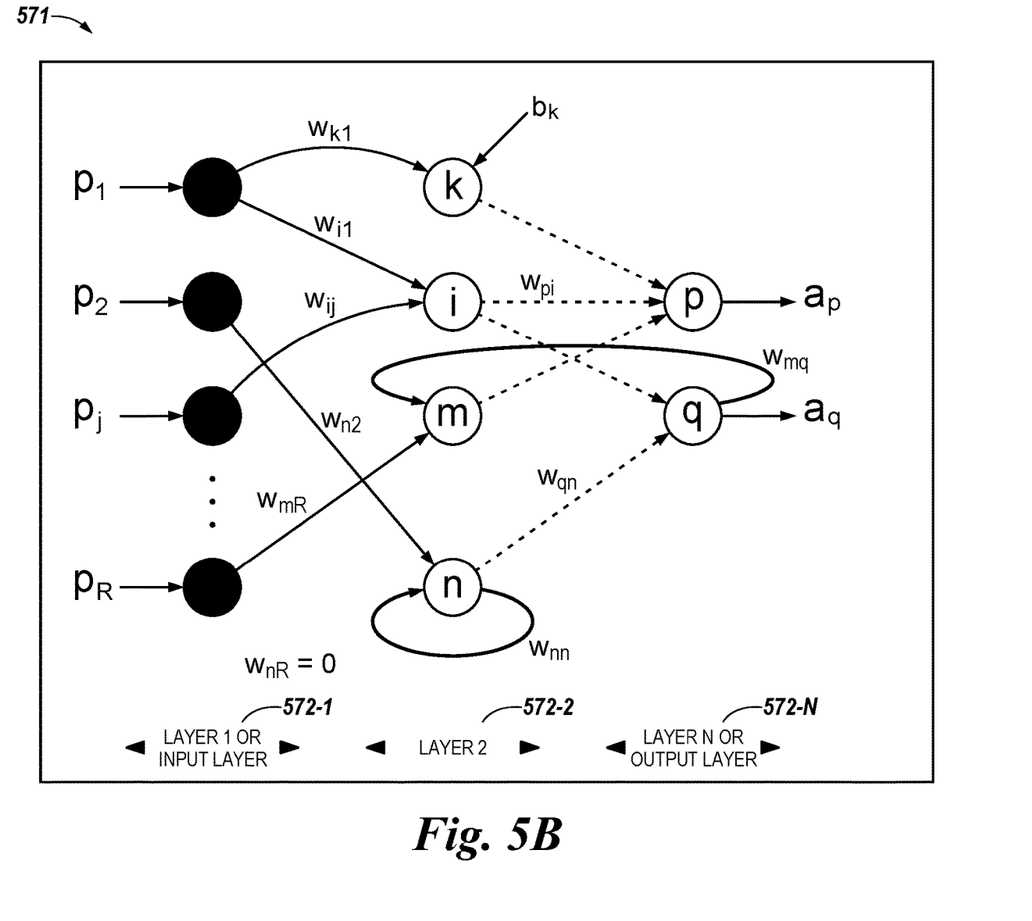
FIG. 5B illustrates an example of an ANN on which ANN integrity verification can be performed in accordance with a number of embodiments of the present disclosure.

FIG. 5B illustrates an example of an ANN 571 on which ANN integrity verification can be performed in accordance with a number of embodiments of the present disclosure. ANN 571 is an example of a recurrent ANN having multiple layers 572-1, 572-2, and 572-N. In this example, layer 572-1 represents an input layer, layer 572-2 represents a hidden layer, and layer 572-N represents an output layer of ANN 571. As an example, the neural network 211 shown in FIG. 2 can be an ANN such as ANN 571. Although only a single hidden layer 572-2 is shown, embodiments can include multiple hidden layers such that ANN 571 may be considered a deep ANN.

In FIG. 5B, $p_1$ to $p_R$ represent inputs to respective nodes (e.g., input nodes "1" to "R") of layer 572-1. In FIG. 5B, "$b_k$" represents a bias corresponding to node "k." Although not shown, various other nodes can include respective bias values which can form a bias vector corresponding to a particular layer and/or partition of the ANN 571. Various synaptic weights associated with connections between nodes of the ANN 571 are also shown. The outputs $a_p$ and $a_q$ of respective nodes "p" and "q" can be determined via an equation such as 562 shown in FIG. 5A. It is noted that embodiments are not limited to the particular ANNs described in FIGS. 5A and 5B.

The present disclosure may be provided as one or more sets of instructions (e.g., computer program product, software, etc.) storable on a computer readable medium and executable (e.g., by a processing resource) to perform one or more methods according to the present disclosure. Such computer readable storage medium can include, but is not limited to, various types of disks including floppy disks, optical disks, CD-ROMs, and magnetic-optical disks, read-only memories (ROMs), random access memories (RAMs), EPROMs, EEPROMs, magnetic or optical cards, or various other types of media suitable for storing electronic instructions.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus, comprising:
   a memory storing weight matrix data and bias data corresponding to a number of artificial neural network (ANN) partitions; and
   responsive to receiving a number of inputs to an artificial intelligence (AI) controller of a system comprising the memory and the ANN:
   determine a particular ANN partition to which the number of inputs correspond;
   read, from the memory:
      the weight matrix data and bias data corresponding to the particular ANN partition; and
      a first cryptographic code corresponding to the particular ANN partition;
   generate, via a safety controller, using the weight matrix data and bias data read from the memory, a second cryptographic code corresponding to the particular ANN partition; and
   perform, via the safety controller, a comparison of the first cryptographic code and the second cryptographic code;
   upon the comparison resulting in a determined mismatch between the first cryptographic code and the second cryptographic code, issue, from the safety controller, an indication of the mismatch to a primary controller of the system; and
   upon the comparison resulting in a determined match between the first cryptographic code and the second cryptographic code, determine an output by evaluating, via the AI controller, the number of inputs to the system using the weight matrix and bias data read from the memory; and
   wherein the safety controller is configured to issue the indication of the mismatch to the primary controller responsive to the determined mismatch.

2. The apparatus of claim 1, wherein the safety controller is configured to generate the second cryptographic code.

3. The apparatus of claim 1, wherein the AI controller is configured to elaborate the number of inputs received by the system while the safety controller is generating the second cryptographic code.

4. The apparatus of claim 1, wherein the AI controller is configured to train the ANN.

5. The apparatus of claim 1, wherein the comparison is performed, by the safety controller, to verify the integrity of the weight matrix and bias data read from the memory.

6. The apparatus of claim 1, wherein the AI controller is configured to, responsive to receiving an update to weight matrix data and bias data stored in the memory, replace the weight matrix data and bias data stored in the memory with updated weight matrix data and bias data.

7. The apparatus of claim 6, wherein the AI controller is further configured to, responsive to receiving the update to weight matrix data and bias data stored in the memory, generate updated cryptographic codes for a corresponding ANN partition based on the updated weight matrix data and bias data.

8. The apparatus of claim 6, wherein the AI controller is further configured to, responsive to receiving the update to weight matrix data and bias data stored in the memory, authenticate the update prior to replacing the weight matrix data and bias data stored in the memory with the updated weight matrix data and bias data.

9. The apparatus of claim 8, wherein the AI controller is further configured to, responsive to receiving the update to weight matrix data and bias data stored in the memory, abort the update responsive to the update failing to be authenticated.

10. The apparatus of claim 1, wherein the memory comprises a non-volatile storage memory resource and a volatile system memory resource.

11. A method, comprising:
    storing, in a memory, weight matrix data and bias data corresponding to a number of artificial neural network (ANN) partitions; and
    responsive to receiving a number of inputs to a system comprising the memory and the ANN:
    determining a particular ANN partition to which the number of inputs correspond;
    reading, from the memory:
       the weight matrix data and bias data corresponding to the particular ANN partition; and
       a first cryptographic code corresponding to the particular ANN partition;
    evaluating, via an artificial intelligence (AI) controller, the number of inputs to the system using the weight matrix and bias data read from the memory;
    while the AI controller is evaluating the number of inputs, performing, via a safety controller, a data integrity verification operation by:
       generating, using the weight matrix data and bias data read from the memory, a second cryptographic code corresponding to the particular ANN partition; and
       performing a comparison of the first cryptographic code and the second cryptographic code;
    upon the comparison resulting in a determined mismatch between the first cryptographic code and the second cryptographic code, issuing, via the safety controller, an indication of the mismatch to a primary controller of the system, the indication being a safety warning and the determined mismatch corresponding to a data integrity verification failure; and
    upon the comparison resulting in a determined match between the first cryptographic code and the second cryptographic code, determining the data integrity verification operation to have resulted in a data integrity verification pass.

12. The method of claim 11, wherein the method includes elaborating, via the AI controller, the number of inputs received by the system, the number of inputs corresponding to data from a number of sensors of an autonomous vehicle.

13. The method of claim 11, wherein the method includes training the ANN via the AI controller.

14. The method of claim 11, wherein the primary controller is a main controller of an electronic control unit (ECU) of an autonomous vehicle, and wherein the method includes operating various subsystems of the autonomous vehicle based on an output received from the AI controller, the output resulting from the evaluating of the number of inputs to the system using the weight matrix and bias data read from the memory.

15. An apparatus employing an artificial neural network (ANN) having a plurality of ANN partitions, the apparatus comprising:
    a memory configured to store weight matrix data and bias data corresponding to the plurality of ANN partitions;

a first controller configured to:
  receive a number of inputs;
  determine a particular ANN partition of the plurality of ANN partitions to which the number of inputs correspond;
  read, from the memory:
    weight matrix data and bias data corresponding to the particular ANN partition; and
    a first cryptographic signature corresponding to the particular ANN partition; and
  determine an output by evaluating the number of inputs;
a second controller configured to:
  while the first controller is evaluating the number of inputs:
    generate, using the weight matrix data and bias data read from the memory, a second cryptographic signature corresponding to the particular ANN partition;
    determine whether the first cryptographic signature and the second cryptographic signature match;
    responsive to determining a mismatch between the first cryptographic signature and the second cryptographic signature, issue an indication of the mismatch in the form of a safety warning to a primary controller; and
    responsive to determining a match between the first cryptographic signature and the second cryptographic signature, not issuing the indication of the mismatch such that the output is provided to the primary controller.

16. The apparatus of claim 15, wherein the apparatus is an electronic control unit (ECU) of an autonomous vehicle.

17. The apparatus of claim 16, wherein the inputs comprise data from sensors of the autonomous vehicle.

18. The apparatus of claim 15, wherein the first controller is an artificial intelligence (AI) controller and the second controller is a safety controller that is coupled to the AI controller and to the primary controller, wherein the safety controller is configured to perform the comparison in association with a data integrity verification operation that is separate from an authentication operation.

* * * * *